US006845703B2

(12) United States Patent
Ugolini

(10) Patent No.: US 6,845,703 B2
(45) Date of Patent: Jan. 25, 2005

(54) MECHANISM FOR THE CONTROLLED CLOSURE OF A LID, IN PARTICULAR FOR ICED-BEVERAGE AND WATER-ICE MAKING MACHINES AND MACHINE THEREWITH

(75) Inventor: Marco Ugolini, Milan (IT)

(73) Assignee: Ugolini S.p.A. (IT)

( * ) Notice: Subject to any disclaimer, the term of this patent is extended or adjusted under 35 U.S.C. 154(b) by 27 days.

(21) Appl. No.: 10/268,468

(22) Filed: Oct. 8, 2002

(65) Prior Publication Data

US 2003/0075520 A1 Apr. 24, 2003

(30) Foreign Application Priority Data

Oct. 19, 2001 (IT) .................................... MI20010556 U

(51) Int. Cl.[7] .............................. A23L 1/00; F25C 5/10; F25C 1/14

(52) U.S. Cl. ............................ 99/275; 99/485; 62/340; 62/390

(58) Field of Search .......................... 99/348, 275, 279, 99/286, 323.1, 485; 366/144–149, 273, 274; 222/146.6, 190, 318, 333, 376, 377; 62/392, 394, 188, 390, 338, 530, 331, 70, 136, 342, 449, 450, 457.2, 457.4, 457.9, 340, 352, 353, 354; 261/36.1, 93, DIG. 7, DIG. 75; 137/896, 392; 141/95, 198; 220/23.4, 912, 23.8; 29/462, 428, 898.07

(56) References Cited

U.S. PATENT DOCUMENTS

| | | | | |
|---|---|---|---|---|
| 4,656,840 | A | * | 4/1987 | Loofbourrow et al. ........ 62/530 |
| 4,696,417 | A | * | 9/1987 | Ugolini ................... 222/146.6 |
| 5,024,067 | A | * | 6/1991 | Maier, II ................... 62/457.4 |
| 5,713,214 | A | * | 2/1998 | Ugolini ....................... 62/188 |
| 5,839,291 | A | * | 11/1998 | Chang ......................... 99/275 |
| 5,901,884 | A | * | 5/1999 | Goulet et al. ............ 222/146.6 |
| 5,906,105 | A | * | 5/1999 | Ugolini ....................... 62/136 |
| 6,467,944 | B2 | * | 10/2002 | Ugolini ...................... 366/144 |
| 6,546,843 | B2 | * | 4/2003 | Ugolini ....................... 99/275 |
| 6,619,051 | B1 | * | 9/2003 | Kilawee et al. ................ 62/78 |

* cited by examiner

*Primary Examiner*—Timothy Simone
(74) *Attorney, Agent, or Firm*—Shlesinger & Fitzsimmons

(57) ABSTRACT

A mechanism (15) for the controlled closure of a lid (13), in particular for an iced-beverage and water-ice making machine (10), comprises a bolt (16) slidable between a locked position and a position of free opening of the door. The bolt is movable to the open position both by means of a button to be manually pushed (21) and by introduction of a thrust tool through an appropriate passage (22). The mechanism further comprises selector means (23) manually operable from the inside of the lid to be moved between a position at which the button action is locked and a position at which the button can be freely operated.

8 Claims, 2 Drawing Sheets

MECHANISM FOR THE CONTROLLED CLOSURE OF A LID, IN PARTICULAR FOR ICED-BEVERAGE AND WATER-ICE MAKING MACHINES AND MACHINE THEREWITH

BACKGROUND OF THE INVENTION

The present invention relates to an innovative mechanism for closing a lid, in particular for iced beverage and water-ice making machines.

Dispensing devices for iced beverages and the like are known that are provided with a tank holding the product and having an upper access lid. Usually these dispensers are easily accessible to the public, and therefore it is often desirable for the lid to be closed by a lock limiting access to the inside of the tank to the authorised staff alone. Sometimes, on the contrary, depending on the discretion of the person in charge of the dispenser, in the case of more watched-over machines it is preferred for convenience to leave the lid available for immediate opening.

When a keylock system is utilised there is the disadvantage that the key can get lost or, more simply, cannot be immediately at the disposal of the staff charged with the dispenser management. In addition, in the case of a plurality of dispensers in the same room, it is further required that one key should be distinguishable from the other and be associated with the corresponding dispenser.

It is a general aim of the present invention to obviate the above mentioned drawbacks by providing an innovative closing mechanism enabling selection between a free-operation mode and an operation mode with a controlled-opening which does not involve use of particular keys while at all events offering a good safety, and which is simple, strong and of limited cost.

SUMMARY OF THE INVENTION

In view of the above aim, in accordance with the invention, a mechanism for the controlled closure of a lid has been conceived, in particular for iced-beverage and water-ice making machines, comprising a bolt which is slidable between a locking position and a free-opening position of the lid, the bolt being movable to the open position both by means of a button to be manually pushed and by introduction of a thrust tool through an appropriate passage, the mechanism further comprising selector means manually operable from the inside of the lid to be moved between a position at which the button action is locked and a position at which the button can be freely operated.

BRIEF DESCRIPTION OF THE DRAWINGS

For better explaining the innovative principles of the present invention and the advantages it offers over the known art, a possible embodiment applying such principles will be described hereinafter by way of example only, with the aid of the accompanying drawings. In the drawings.

DETAILED DESCRIPTION OF THE INVENTION

Figure 1:
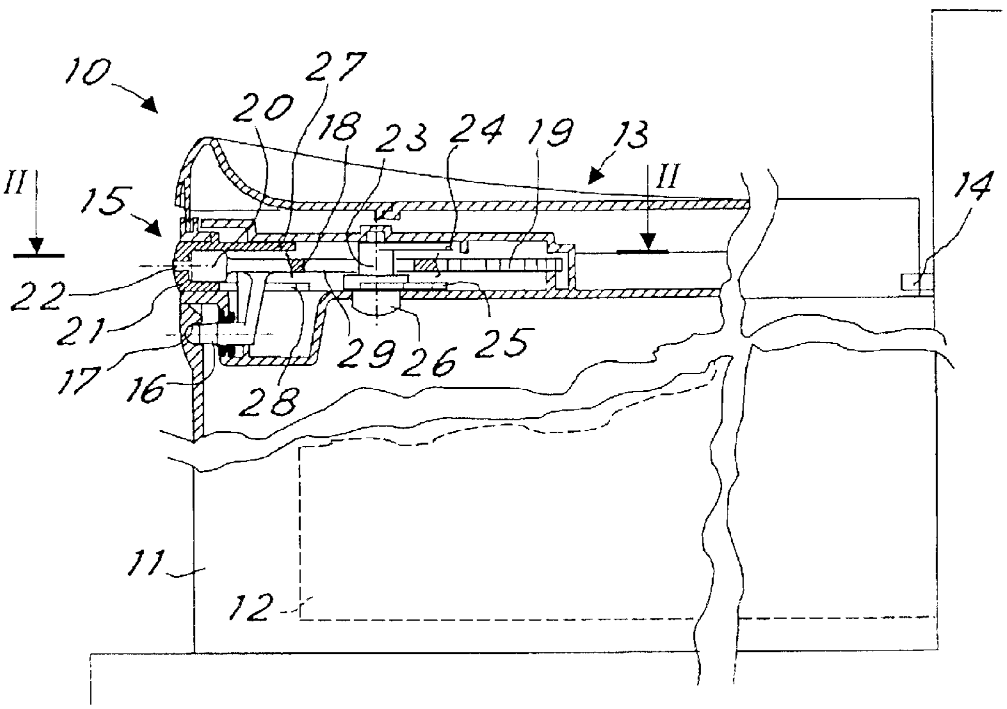
FIG. 1 is a partly-in-section partial view of an iced-beverage or water-ice dispenser provided with a lid-closing mechanism in accordance with the invention.

With reference to the drawings, partly shown in FIG. 1 is a machine for dispensing iced beverages or water-ices, generally identified by 10, which comprises a tank 11 for containing the product to be dispensed. The tank contains a cooling and stirring element 12 for the product and is provided with a closing lid 13. The rest of the machine with the refrigerating and electric circuits, dispensing taps, product stirrer, etc. is neither shown nor described in detail as it can be easily envisaged by a person skilled in the art.

Lid 13 is provided with a rear fitting joint 14 and a front closing mechanism 15 enclosed in a suitable box-shaped structure in the lid. The closing mechanism 15 comprises a bolt 16 to be snap fitted in an appropriate housing 17 present in the inner wall of the tank.

Bolt 16 projects from a running slider 18 provided at the rear part thereof with a spring 19 urging it to the closed position. Advantageously the spring is moulded in one piece with the slider.

At the front the slider is provided with an operating end or head 20 on which a button 21 is axially and slidably mounted, said button emerging from the lid for manual opening of the latter. Button 21 is provided at the front with a hole 22 through which the operating end of the slider can be reached, by means of a thin rod-shaped tool such as a mere screwdriver of small sizes for example, as clarified in the following.

Mechanism 15 comprises manual means for selective locking of the sinking movement of button 21. This means comprises a selector pin 23 provided on one side with radial projections 24, 25. Pin 23 has an operating head 26 jutting out inside the tank and enabling manual rotation of the pin between a free-opening position of the lid, at which the radial projections 24, 25 do not interfere with the movement of button 21 (FIGS. 1, 2 and 3), and a controlled-opening position of the lid, at which the radial projections 24, 25 interfere with suitable rear projections 27, 28 present on button 21 (FIGS. 4 and 5) to prevent sinking of the button to the open position.

As can be viewed from the figures, advantageously pin 23 passes through slider 28 at a slot 29 formed in the slider thickness so that the pin embodies a guide means for the slider movement and the elements jutting out of the pin arrange themselves on the opposite faces of the slider. In a complementary manner, also the rear projections in the button are disposed on the opposite faces of the slider. The slider is provided with a longitudinal rib 30 restricting the pin rotation to 180°, thereby accurately setting the free-opening position and controlled-opening position of the button that can be selected by rotation of the pin itself, through abutment of the upper radial element 24 against said rib.

Figure 2:
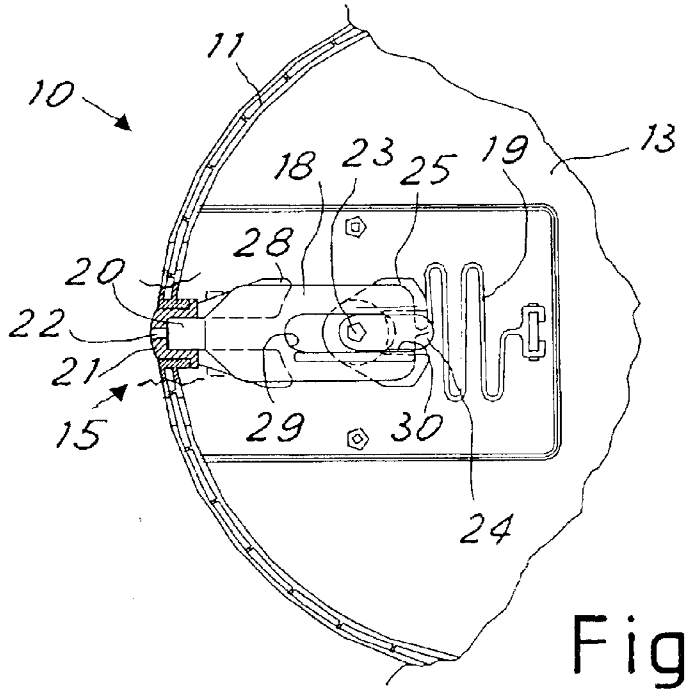
FIG. 2 is a partial view taken along line II—II in FIG. 1.
Figure 5:
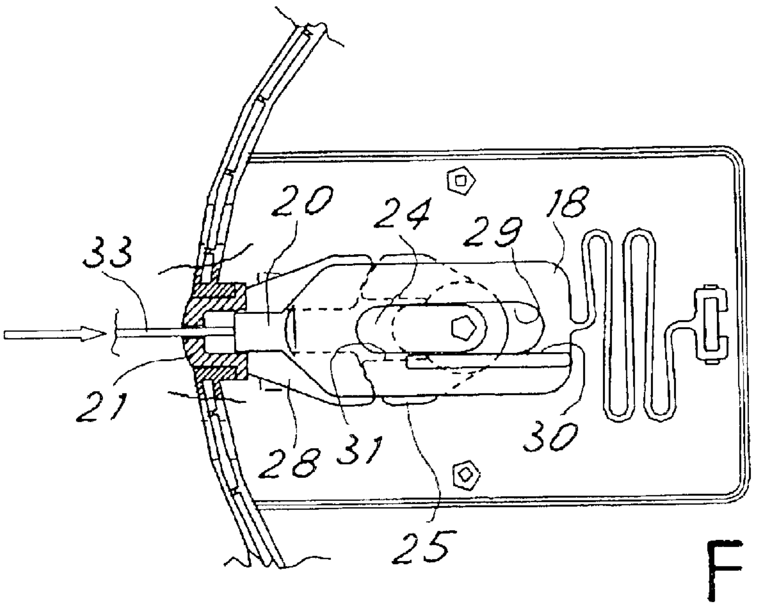
FIG. 5 is a top view of the device seen in the position of FIG. 4.

As shown in FIGS. 2 and 5, the upper radial element 24 is made as a mere elongated element, whereas the lower radial element 25 is fork-shaped to define a central passage 31 through which a connecting arm 32 between the bolt 16 and the slider body 18 can slide. The lower rear projection 28 of the button is fork-shaped too for the same purpose.

At this point it is apparent that the intended purposes are achieved by providing a closing mechanism for a dispenser of the above type, of simple structure and use, which is strong but not very expensive.

As can be seen in the figures, a mechanism in accordance with the invention can be practically formed of only three moulded pieces of an appropriate plastic material: the pin with the radial projections, the slider with spring and bolt, and the bored button 21.

Figure 3:
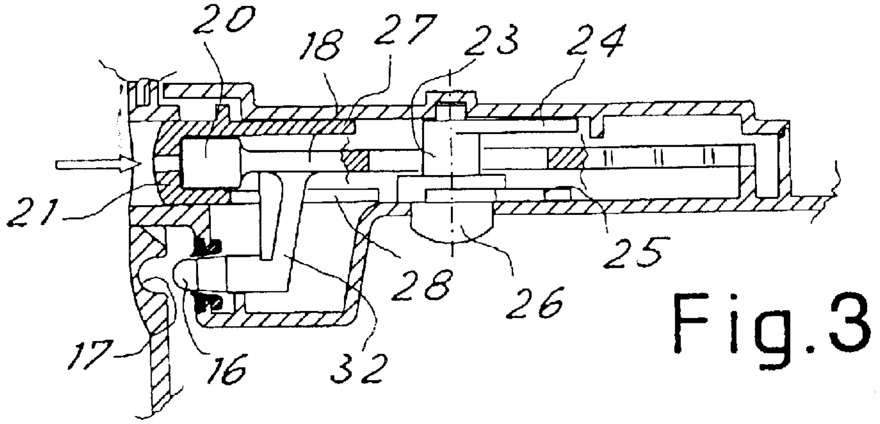
FIG. 3 is an enlarged side view in section of the closing mechanism during actuation in one of its operating modes.
Figure 4:
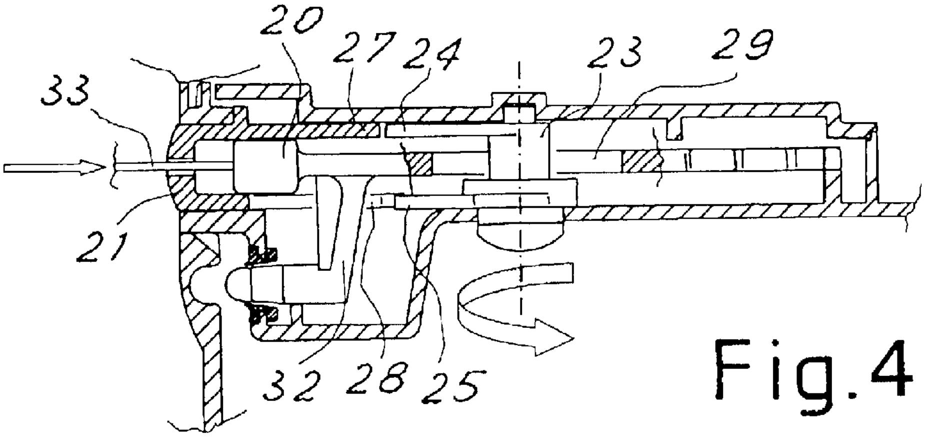
FIG. 4 is a view similar to FIG. 3 but with the closing mechanism during actuation in a second operating mode thereof.

In use, if the selector pin is left in the free-opening position the lid can be opened by merely pressing button 21 with a finger, as shown in FIG. 3. By rotating the selector pin to the opposite controlled-opening position, the button is locked and the bolt can be only opened by pushing the slider by means of an appropriate tool 33 fitted in the hole passing through the button (FIG. 4).

Since this second opening mode can be hardly identified by an occasional observer, a good safety against unauthorised opening is obtained. On the other hand, since individual keys are not required for each machine, the task of the authorised staff is made simpler.

Therefore it is apparent that a machine for producing iced beverages and the like conceived as above described can be left with reduced surveillance without on the other hand complicating the task of the staff assigned to it.

Obviously, the above description of an embodiment applying the innovative principles of the present invention is given by way of example only and therefore must not be considered as a limitation of the scope of the patent rights herein claimed. For example, the control hole in the slider can also have a shaped section to enable introduction of a single appropriate tool the shape of which matches that of the hole, thereby increasing the safety degree of the closure.

What is claimed is:

1. A mechanism for the controlled closure of a lid for iced-beverage and water-ice making machines, the mechanism comprising a bolt which is slidable between a locked position and an open position for opening of the lid, the bolt being movable to the open position both by means of a button to be manually pushed and by introduction of a thrust tool through an appropriate passage, the mechanism further comprising selector means manually operable from the inside of the lid to be moved between a first position at which the button action is locked and a second position at which the button can be freely operated.

2. A mechanism as claimed in claim 1, wherein said appropriate passage for introduction of a thrust tool is made in the button and the bolt projects from an operating slider disposed with an operating end axially slidable behind the button so that it can be reached through said passage.

3. A mechanism as claimed in claim 1, wherein the selector means comprises a pin with elements radially projecting therefrom, the pin having an operating end appearing on the inner side of the lid so that it can be manually rotated to bring said projecting elements to interfere with the button movement when the pin is rotated to an angular position corresponding to said locked position of the button action.

4. A mechanism as claimed in claim 3, wherein said appropriate passage for introduction of a thrust tool is made in the button and the bolt projects from an operating slider disposed with an operating end axially slidable behind the button so that it can be reached through said passage and the pin passes through the slider at a longitudinal slot in the slider and the radially projecting elements of said pin are disposed on the two opposite faces of the slider.

5. A mechanism as claimed in claim 4, wherein the button has projections at the rear part thereof that are disposed on opposite faces of the slider and are designed to bear on said elements radially projecting from the pin when in the locked position.

6. A mechanism as claimed in claim 5, wherein the operating end of the slider runs in the button between the rear projections of the button.

7. A mechanism as claimed in claim 4, wherein the slider is provided with a longitudinal rib limiting rotation of the pin to 180°, thereby setting, through abutment of the upper radial element against the rib, the first and second positions of the button, which positions can be selected by rotation of the pin itself.

8. A mechanism as claimed in claim 2, wherein the slider, bolt and spring means urging the bolt to the closed position are of one piece construction and made of molded plastic material.

* * * * *